United States Patent
Arnold et al.

(10) Patent No.: US 9,593,769 B2
(45) Date of Patent: Mar. 14, 2017

(54) METHOD AND CONTROL DEVICE THERETO FOR OPERATING A POWERTRAIN

(71) Applicant: ZF Friedrichshafen AG, Friedrichshafen (DE)

(72) Inventors: Jörg Arnold, Immenstaad (DE); Klaus Steinhauser, Kressbronn (DE); Thilo Schmidt, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/657,055

(22) Filed: Mar. 13, 2015

(65) Prior Publication Data
US 2015/0260282 A1    Sep. 17, 2015

(30) Foreign Application Priority Data

Mar. 13, 2014   (DE) .................. 10 2014 204 640

(51) Int. Cl.
*F16H 61/12*   (2010.01)
*F16H 47/06*   (2006.01)
*F16H 59/72*   (2006.01)

(52) U.S. Cl.
CPC ............ *F16H 61/12* (2013.01); *F16H 47/06* (2013.01); *F16H 59/72* (2013.01); *F16H 2061/1276* (2013.01); *F16H 2312/022* (2013.01)

(58) Field of Classification Search
CPC .......... F16H 47/06; F16H 59/72; F16H 61/12; F16H 2061/1276; F16H 2312/022
See application file for complete search history.

(56) References Cited

U.S. PATENT DOCUMENTS

| | | | | |
|---|---|---|---|---|
| 5,609,067 A | * | 3/1997 | Mitchell | F16H 61/12 192/3.63 |
| 6,055,475 A | * | 4/2000 | Moriyama | F16H 61/08 477/97 |
| 6,248,042 B1 | * | 6/2001 | Lee | B60W 10/115 477/109 |
| 8,311,715 B2 | | 11/2012 | Gierer et al. | |
| 8,751,122 B2 | | 6/2014 | Arnold et al. | |

(Continued)

FOREIGN PATENT DOCUMENTS

| | | |
|---|---|---|
| DE | 10 2007 001 499 A1 | 7/2008 |
| DE | 10 2007 002 171 A1 | 7/2008 |
| DE | 10 2007 060 162 A1 | 6/2009 |

OTHER PUBLICATIONS

German Search Report, Sep. 19, 2014.

*Primary Examiner* — Jerrah Edwards
*Assistant Examiner* — Tamara Weber
(74) *Attorney, Agent, or Firm* — Dority & Manning, P.A.

(57) ABSTRACT

A method for operating a drive train that includes a converter as the start-up element, an automatic transmission, and an output, whereas, after start of the drive unit, the rotational speed of a turbine of the converter is monitored, whereas, if it is determined that, within a defined first time frame after the start of the drive unit, the rotational speed of the turbine reaches or exceeds a first threshold value, a properly filled converter is inferred. If, within the defined first time frame, the rotational speed of the turbine falls short of the first threshold value, an improperly filled converter or a converter that has run empty is inferred.

6 Claims, 2 Drawing Sheets

(56) References Cited

U.S. PATENT DOCUMENTS

| | | | |
|---|---|---|---|
| 8,768,590 B2* | 7/2014 | Tsukamoto | F16H 61/20 192/220.1 |
| 2004/0242360 A1* | 12/2004 | Nakayashiki | F16H 61/20 475/120 |
| 2006/0293146 A1* | 12/2006 | Nakayashiki | F16H 59/72 477/76 |
| 2008/0058158 A1* | 3/2008 | Kobayashi | F16H 59/105 477/134 |
| 2008/0077297 A1* | 3/2008 | Ito | F16H 59/72 701/48 |
| 2013/0072348 A1* | 3/2013 | Lochocki, Jr. | B60W 10/06 477/54 |

* cited by examiner

METHOD AND CONTROL DEVICE THERETO FOR OPERATING A POWERTRAIN

FIELD OF THE INVENTION

The invention relates to a method for operating a drive train and a control device for implementing the method.

BACKGROUND

FIG. 1 shows a diagram known from the state of the art of a drive train of a motor vehicle with a drive unit 1 and an automatic transmission 2 switched between the drive unit 1 and an output 3, whereas the automatic transmission 2 is carried out as an automatic or automated manual transmission and comprises several shifting elements 4 formed as couplings and/or brakes. A start-up element formed as a converter 5 is positioned between the drive unit 1 and the automatic transmission 2, whereas one converter lock-up clutch 6 is allocated to the converter 5. Of the converter 5, FIG. 1 shows a turbine wheel 7 and a pump wheel 8. FIG. 1 also shows a transmission selector lever 9 and a transmission control device 10. The operation of the automatic transmission 2, including the converter 5 and the converter 25 lock-up clutch 6, is controlled and/or governed with the assistance of the transmission control device 10. Through the transmission selector lever 9, a shift position for the automatic transmission 2, namely at least one of the shift positions N (neutral), P (park), D (drive-forward travel) and R (reverse travel), is selected.

In practice, it is already known from practice to monitor an automatic transmission for whether, if a shift position of the automatic transmission that is free of a frictional connection is selected through the transmission selector lever, an unwanted frictional connection has built up. However, it has so far not been possible to reliably perform this monitoring.

SUMMARY OF THE INVENTION

On this basis, the present invention is subject to a task of creating a new method for operating a drive train and a control device for implementing the method. Additional objects and advantages of the invention will be set forth in part in the following description, or may be obvious from the description, or may be learned through practice of the invention.

This task is solved by a method for operating drive train in accordance as described and claimed herein.

After the start of the drive unit, the rotational speed of a turbine of the converter is monitored, whereas, if it is thereby determined that, within a defined first time frame after the start of the drive unit, the rotational speed of the turbine of the converter reaches or exceeds a first threshold value, a properly filled converter is inferred, whereas, if, within the defined first time frame after the start of the drive unit, the rotational speed of the turbine of the converter does not reach or exceed a first threshold value, a converter that has run empty is inferred.

The invention proposes that, immediately after the start of the drive unit within the first time frame, on the basis of the rotational speed of the turbine of the converter, there be a monitoring of whether the converter is properly filled, or whether the converter has run empty. Only if it is thereby determined that a properly filled converter is present can there subsequently be a monitoring, on the basis of the rotational speed of the turbine of the converter, of whether an unwanted frictional connection has built up in the automatic transmission.

Preferably, the first time frame is dependent on the transmission oil temperature in such a manner that, the higher the transmission oil temperature, the shorter the first time frame is selected. Thereby, the examination of whether there is a properly filled converter or converter that has run empty can be performed in a particularly advantageous manner; that is, adapted to the transmission oil temperature of the automatic transmission.

According to an advantageous additional embodiment, if a properly filled converter is inferred, and if it is also subsequently determined within a defined second time frame after the start of the drive unit that, for a shift position of the automatic transmission that is free of a frictional connection and selected through a transmission selector lever, the rotational speed of the turbine of the converter subsequently reaches or falls short of a second threshold value, an error in the automatic transmission is inferred. The examination of an error in the automatic transmission, following the examination of whether there is a properly filled converter or converter that has run empty, is particularly advantageous.

According to an additional advantageous embodiment, if, for a parked shifting position of the automatic transmission selected through the transmission selector lever, the rotational speed of the turbine of the converter within the defined second time frame reaches or falls short of the second threshold value, an unwanted frictional connection in the automatic transmission is inferred as an error. The examination of whether, despite a selected shift position that is free of a frictional connection, there is an unwanted frictional connection in the automatic transmission, may reliably take place with the present invention.

The invention is based on the finding that a converter that has run empty and an unwanted frictional connection in the automatic transmission immediately after the start of the vehicle lead to an error pattern that is generally the same; that is, that immediately after the start of the drive unit, the rotational speed of the turbine of the converter is less than a threshold value. In order to, upon the monitoring of the rotational speed of the turbine of the converter, not incorrectly infer an unwanted frictional connection in the automatic transmission, prior to this, on the basis of the rotational speed of the turbine of the converter, there is an examination of whether there is a properly filled converter or converter that has run empty. Only if it is determined that there is a properly filled converter is there subsequently an examination, based on the rotational speed of the turbine of the converter, of whether an unwanted frictional connection has built up in the transmission.

Preferably, the first threshold value is greater than the second threshold value. For the examination of whether there is a properly filled converter or converter that has run empty, and the subsequent examination of whether, despite a selected shift position of the automatic transmission that is free of a frictional connection, an unwanted frictional connection has built up in the same, this relationship of the two threshold values is particularly advantageous.

Preferably, the second time frame, which is greater than the first time frame, is dependent on the transmission oil temperature in such a manner that, the higher the transmission oil temperature, the shorter the second time frame is selected. In doing so, it is in turn possible to optimally adapt the examination of whether there is an unwanted frictional connection in the automatic transmission to the specific operating situation; that is, to the transmission oil temperature of the automatic transmission.

A control device in accordance with the invention is described below.

Preferred additional embodiments arise from the following description.

BRIEF DESCRIPTION OF THE DRAWINGS

Embodiments of the invention are, without any limitation, more specifically described by means of the drawing. Thereby, the following is shown.

DETAILED DESCRIPTION

Figure 1:
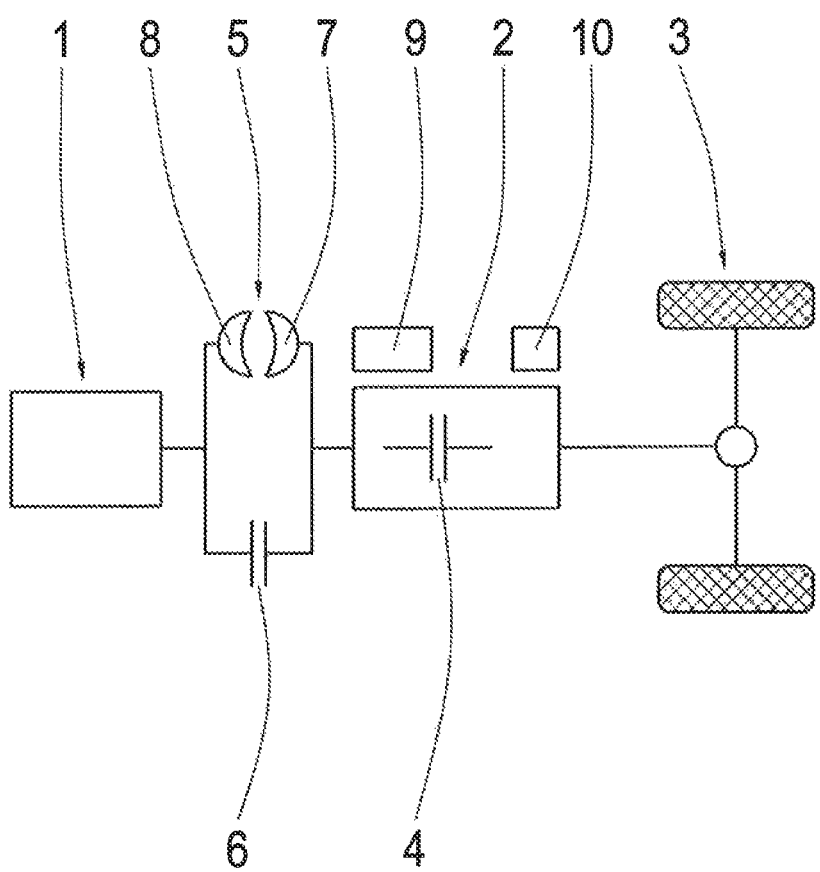
FIG. 1 is a drive train diagram of a motor vehicle.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The present invention relates to a method for operating a drive train of a motor vehicle and a control device for implementing the method.

FIG. 1 shows a schematized drive train diagram of a motor vehicle with a drive unit 1, an automatic transmission 2 and an output 3, whereas the automatic transmission 2, which comprises several shifting elements 4, is shifted between the drive unit 1 and the output 3, and the supply of pulling force of the drive unit 1 is provided at the output 3. As the start-up element, the drive train of FIG. 1 includes a converter 5, whereas, in the converter 5, a turbine wheel 7 and a pump wheel 8 are schematically shown. In parallel to the converter 5, a converter lock-up clutch 6 is shifted.

Through a transmission selector lever 9, a shift position for the automatic transmission 2, at least one of the shift positions N (neutral), P (park), D (drive-forward travel) and R (reverse travel), is selected. The operation of the automatic transmission 2 is controlled and/or governed by a transmission control device 10.

In accordance with the invention, immediately after the start of the drive unit 1, in particular beginning with the presence of an activation signal for the ignition of the drive unit 1, the rotational speed of the turbine 7 of the converter 5 is monitored. Such monitoring of the rotational speed of the turbine 7 of the converter 5 takes place in such a manner that there is a monitoring of whether the rotational speed of the turbine 7 within a defined first time frame after the start of the drive unit 1 reaches or exceeds a first threshold value.

If it is then determined that, within the defined first time frame after the start of the drive unit 1, the rotational speed of the turbine 7 of the converter reaches or exceeds the first threshold value, a properly filled converter 5 is inferred. However, if the rotational speed of the turbine 7 of the converter 5 does not reach or falls short of the first threshold value within the defined first time frame after the start of the drive unit 1, an improperly filled converter 5 or a converter 5 that has run empty is inferred.

Figure 2:
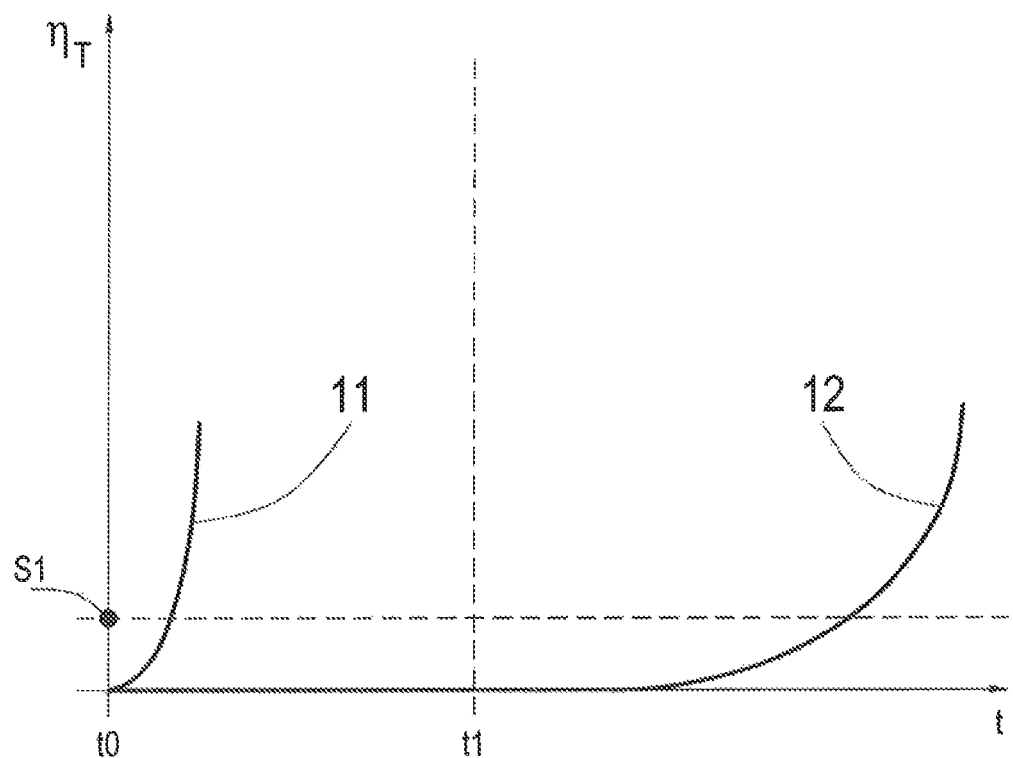
FIG. 2 is a timing diagram to clarify the method for operating a drive train.

In FIG. 2, over the time period t, the progression of the rotational speed nT of the turbine 7 of the converter 5 is plotted for two different states, whereas the drive unit 1 is started at the point in time t0, and whereas the point in time t1 defines the defined first time frame after the start of the drive unit 1.

For the curve progression 11, there is a rotational speed progression of the turbine 7 of the converter 5, for which, within the defined first time frame, the rotational speed nT of the turbine 7 of the converter 5 exceeds the first threshold value S1, such that, if the curve progression 11 is present, a properly filled converter 5 is inferred.

However, with the curve progression 12, the rotational speed nT of the turbine 7 of the converter 5 remains so low beyond the point in time t1, thus beyond the defined first time frame after the start of the drive unit 1, that the same does not reach, or does not exceed, the first threshold value S1, such that, for the curve progression 12, an improperly filled converter 5 or a converter 5 that has run empty is inferred.

The first time frame, within which the rotational speed of the turbine 7 of the converter 5 for the detection of a properly filled converter must reach or exceed the first threshold value S1, is preferably dependent on the transmission oil temperature, whereas the first time frame is selected to be shorter, the higher the transmission oil temperature of the automatic transmission 2 is. Thereby, the detection of whether there is a properly filled or improperly filled converter 5 is optimally adapted to the operating state of the automatic transmission 2 and the converter 5.

According to an advantageous additional form of the invention, it is provided that, if a properly filled converter 5 is inferred, subsequently in a second defined time frame (not shown in FIG. 2) after the start of the drive unit 1, which is preferably greater than the first defined time frame, the rotational speed of the turbine 7 of the converter 5 continues to be evaluated. If it is thereby determined that the rotational speed nT of the turbine 7 5 for a shift position of the automatic transmission 2 that is free of a frictional connection and selected through the transmission selector lever 9 subsequently reaches or falls short of a second threshold value, an error in the automatic transmission 2 (that is, an unwanted frictional connection in the automatic transmission 2) is inferred.

In particular, if, for a parked shifting position of the automatic transmission 2 selected through the transmission selector lever 9, the rotational speed of the turbine 7 of the converter 5 for a previously detected converter 5 that is property filled, within a defined second time frame, reaches or falls short of the second threshold value, an error (that is, an unwanted frictional connection in the automatic transmission 2) is inferred.

The second time frame, within which the examination of the unwanted frictional connection in the automatic transmission 2 takes place, is thereby just like the first time frame, within which a properly or improperly filled converter is inferred, preferably depending on the transmission oil temperature, whereas the second time frame is selected to be shorter, as the higher the transmission oil temperature is.

As already pointed out, for the monitoring of whether there is a properly or improperly filled converter 5, there is a monitoring of whether, within the first time frame after the start of the drive unit, the rotational speed of the turbine 7 of the converter 5 reaches or exceeds a first threshold value. For the subsequent monitoring of whether, for the selected shift position that is free of a frictional connection for the automatic transmission 2, there is an unwanted frictional connection in the automatic transmission 2 there is a monitoring of whether, in a second time frame that is greater than the first time frame, the rotational speed of the turbine 7 of the converter 5 reaches or falls short of a second threshold value. Thereby, the first threshold value is greater than the second threshold value.

With the present invention, it is possible to reliably distinguish and reliably detect the error pattern of a converter 5 that has run empty or an improperly filled converter 5, along with the error pattern of an unwanted frictional connection in the automatic transmission 2 despite a selected shift position that is free of a frictional connection, both based on the progression of the rotational speed of the turbine 7 of the converter 5.

The present invention also relates to a control device for implementing the method. This control device preferably comprises the transmission control device 10.

The control device includes tools for implementing the method in accordance with the invention. These tools comprise hardware and software tools.

The hardware tools comprise data interfaces, in order to exchange data with structural units for implementing the method in accordance with the invention. The hardware tools also comprise a processor and a memory, whereas the memory serves to store the data and the processor serves to process the data.

The software tools comprise program modules for implementing the method in accordance with the invention.

Modifications and variations can be made to the embodiments illustrated or described herein without departing from the scope and spirit of the invention as set forth in the appended claims.

The invention claimed is:

1. A method for detecting an operational error in a converter used as a start-up element in a drive train, wherein the drive train includes a drive unit, a converter, an automatic transmission, a transmission control device, and an output, the method comprising:

starting the drive unit, and immediately after start of the drive unit monitoring rotational speed of a turbine of the converter with the transmission control device;

with the transmission control device, determining whether, within a defined first time frame after the start of the drive unit, the rotational speed of the turbine reaches or exceeds a first threshold value;

the transmission control device inferring a properly filled converter if the rotational speed of the turbine reaches or exceeds the first threshold value within the first time frame;

the transmission control device inferring an improperly filled or empty converter if the rotational speed of the turbine does not reach or exceed the first threshold value;

via a transmission selector lever, placing the automatic transmission in a shift position;

if a properly filled converter is inferred by the transmission control device, further determining whether the rotational speed of the turbine subsequently falls short of a second threshold value for the selected shift position of the automatic transmission within a defined second time frame; and if the rotational speed of the turbine falls short of the second threshold value, the transmission control device infers a frictional connection error in the automatic transmission.

2. The method according to claim 1, wherein the selected shift position is a parked shifting position of the automatic transmission.

3. The method according to claim 1, wherein the first threshold value is greater than the second threshold value.

4. The method according to claim 1, wherein the second time frame is greater than the first time frame.

5. The method according to claim 1, wherein the transmission control device sets the first time frame dependent on a temperature of the transmission oil in such a manner that, the higher the transmission oil temperature, the shorter the first time frame.

6. The method according to claim 1, wherein the transmission control device sets the second time frame dependent on a temperature of the transmission oil in such a manner that, the higher the transmission oil temperature, the shorter the second time frame.

\* \* \* \* \*